United States Patent [19]

Reinhardt et al.

[11] Patent Number: 4,694,371
[45] Date of Patent: Sep. 15, 1987

[54] PROTECTION CIRCUIT FOR STALLING PROTECTION IN COMMUTATORLESS DIRECT CURRENT MOTORS

[75] Inventors: Wilhelm Reinhardt, Schrozberg-Guetbach; Helmut Lipp, Hohebach, both of Fed. Rep. of Germany

[73] Assignee: ebm Elektrobau Mulfingen GmbH & Co., Fed. Rep. of Germany

[21] Appl. No.: 730,199

[22] Filed: May 3, 1985

[30] Foreign Application Priority Data

May 17, 1984 [DE] Fed. Rep. of Germany ....... 3418276

[51] Int. Cl.$^4$ ................................................ H02H 7/09
[52] U.S. Cl. ......................................... 361/23; 361/28
[58] Field of Search ............... 361/23, 24, 28, 31, 361/29, 30, 33; 318/445, 254, 434, 138

[56] References Cited

U.S. PATENT DOCUMENTS

| | | | |
|---|---|---|---|
| 3,387,205 | 6/1968 | Terdall | 318/434 |
| 3,919,600 | 11/1975 | Sons | 361/28 X |
| 3,931,557 | 1/1976 | Osburn | 361/23 X |
| 4,030,005 | 6/1977 | Doemen | 318/138 |
| 4,052,625 | 10/1977 | Cameron | 361/23 X |
| 4,245,370 | 1/1981 | Baker | 361/28 X |
| 4,354,214 | 10/1982 | Walton | 361/23 |
| 4,484,114 | 11/1984 | Ebbs | 318/254 X |
| 4,504,881 | 3/1985 | Wada et al. | 361/28 X |
| 4,509,088 | 4/1985 | Profio | 361/31 X |
| 4,535,275 | 9/1985 | Müller | 318/254 |
| 4,542,323 | 9/1985 | Doemen | 318/254 |
| 4,578,623 | 3/1986 | Tsuzutani et al. | 318/254 |

FOREIGN PATENT DOCUMENTS 3419668 12/1984 Fed. Rep. of Germany ........ 361/23

Primary Examiner—A. D. Pellinen
Assistant Examiner—A. Jonathan Wysocki
Attorney, Agent, or Firm—Jones, Askew & Lonsford

[57] ABSTRACT

A protection circuit for stalling protection in commutatorless direct current motors is driven by Hall generators, in particular Hall IC's. A respective semiconductor circuit element (5, 14) disposed in series with each stator winding (1, 2) is turned on or off in dependence on a control voltage induced in the stator windings (1, 2). The control voltage ($U_B$) is constituted by the sum of the operating voltage in the unenergized windings (1, 2) and the counter-e.m.f. induced in these windings, whereby, if the sum of these voltages is greater than the operating voltage, the semiconductor circuit element (5, 14) connected to the respective energized winding (1, 2) is turned on, and, if the counter-e.m.f. is zero or falls below a predetermined cut-off value, the respective semiconductor circuit element (5, 14) is turned off.

11 Claims, 11 Drawing Figures

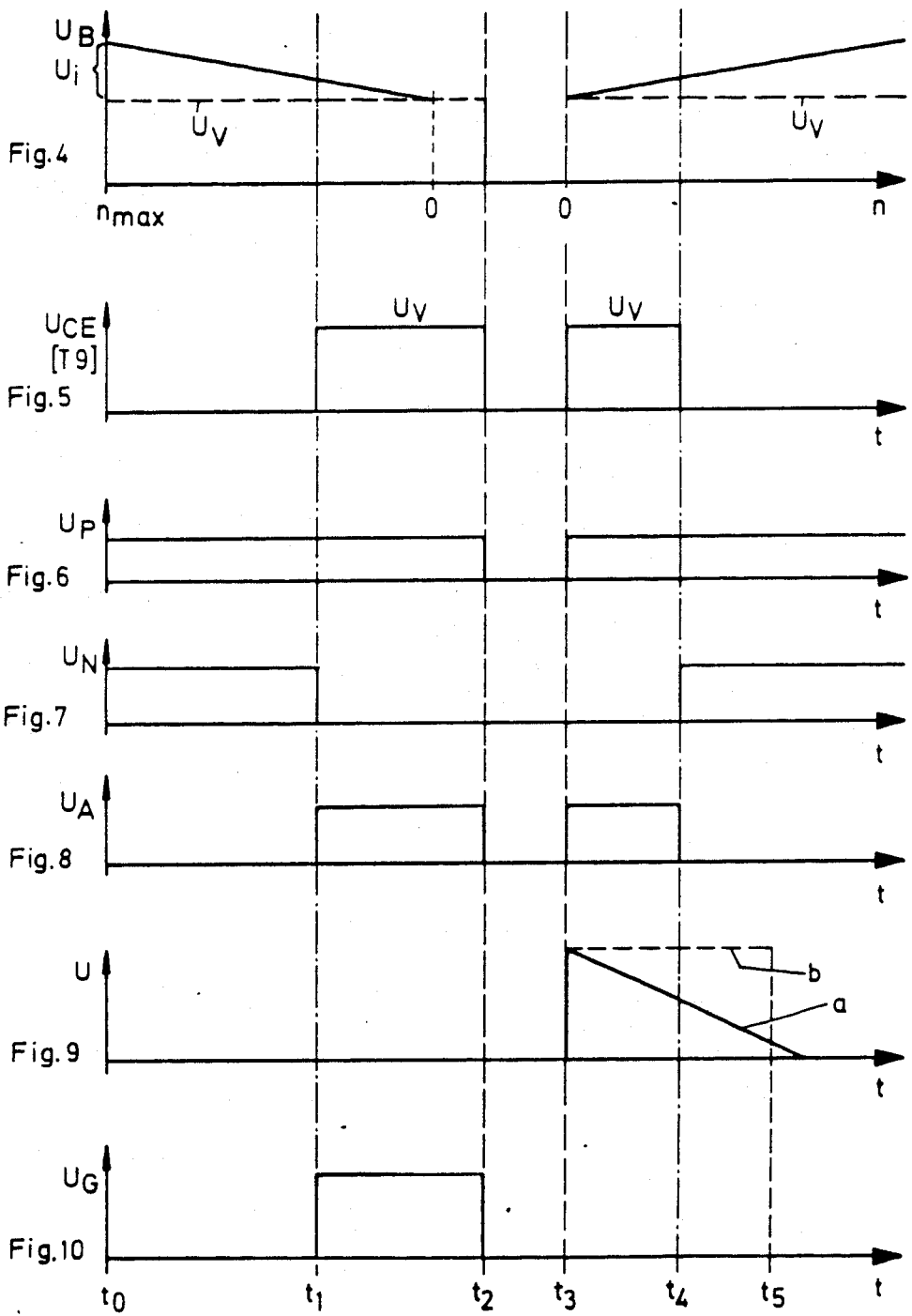

PROTECTION CIRCUIT FOR STALLING PROTECTION IN COMMUTATORLESS DIRECT CURRENT MOTORS

This invention relates to a protection circuit for stalling protection in commutatorless direct current motors, driven by Hall-IC's for example, in which a respective semiconductor circuit element disposed in series with each stator winding is turned on or off in dependence on a control voltage induced in the stator windings.

BACKGROUND

A protection circuit of this general type is already known from DE-OS No. 32 03 829. In this circuit, in order to avoid thermal overloading of the stator winding in the event of the motor stalling, a transistor becomes conductive, the emitter-collector path of which is disposed in series with the stator winding and the commutation transistor connected thereto, and the base of which carries the voltage induced in the stator winding. This circuit is suitable for motors of smaller power capacity. In motors of higher capacity there is a danger of overheating and therefore of destruction of the stalling protection transistor. Also in larger motors there are difficulties at the time of starting. This is attributable to the fact that, because of the required higher starting torque, an RC-circuit provided for automatic starting has to be made considerably larger, and the space available in the motor is insufficient for such a circuit.

Furthermore an electronic overload protection circuit arrangement is known from DE-AS No. 23 61 645. In this arrangement, a resistor is provided in series with the drive winding for receiving the induction current. In parallel with this resistor is a delay circuit which is connected to the output of a transistor switching device consisting of two transistors, one transistor of which is disposed in the supply circuit of the winding, the supply to the circuit being cut off when there is excess current in this transistor. Furthermore a lifting device is provided which is operable from outside and which removes the blocking caused by the excess current in this transistor.

A circuit arrangement for current control of a direct current motor is known from DE-PS No. 31 39 545, in which arrangement the voltage across a measurement resistor is used as the control voltage for a transistor. Driving of this transistor results in discharging of a timing circuit, which leads via an amplifier circuit to an interruption of the motor current and thereby to a lowering of the voltage across the measurement resistor. If the operating voltage of the transistor falls below a certain value, the transistor is turned off and the timing circuit is freed again. In dependence on the induction current in the windings during turning of the motor, the driving of the timing circuit resumes and again brings about current supply to the windings.

The invention has as its object to develop a protection circuit which ensures effective protection of the motor in the case of stalling of the rotor and which can be constructed in a space-saving way.

According to the invention there is provided a protection circuit for stalling protection in commutatorless direct current motors, for example in such motors driven by Hall-generators, in particular Hall-IC's, in which a respective semiconductor circuit element disposed in series with each stator winding is turned on or off in dependence on a control voltage induced in the stator windings, wherein there is used as the control voltage the sum of the operating voltage in the unenergised windings and the counter-e.m.f. induced in these windings, whereby, if the sum of these voltages is greater than the operating voltage, the semiconductor circuit element connected to the respective energised winding is turned on, and, if the counter-e.m.f. is zero or falls below a predetermined cut-off value, the respective semiconductor circuit element is turned off.

In this way cut-out of the motor takes place in dependence on the magnitude of the counter-e.m.f. in the respective unenergised winding, which is advantageous, since the magnitude of the counter-e.m.f. is directly dependent on the rate of rotation of the motor. According to the invention it is thereby possible not only to achieve a cut-out when the motor has stopped but indeed also when the rate of rotation of the motor falls below a minimum rate of rotation.

Furthermore it is advantageous according to the invention, in the starting phase of the direct current motor, if start-up bridging circuit ensures by means of a delay circuit that, for the time interval for which the voltage value of the counter-e.m.f. is zero or less than the cut-out value, the respective semiconductor circuit element connected to the energised winding is turned on. On starting of the motor from its stopped position the occurrence of an unwanted cut-out is in this way prevented.

Furthermore it is advantageous according to the invention if, in the starting phase, a starting current limitation circuit is operable which, up to a predetermined level of the starting current, turns the semiconductor circuit elements on and off until the counter-e.m.f. produced in the motor windings has reached such a level that only a limited motor current can flow. Thereby the circuit takes account of the fact that the counter-e.m.f. offsets the operating voltage such that automatic limitation of the current flowing through the windings ensues.

In order that the invention may be more fully understood, a preferred embodiment of the invention will now be described, by way of example, with reference to the accompanying drawings, in which:

BRIEF DESCRIPTION OF THE DRAWINGS

FIG. 4 shows the variation of the operating voltage $U_v$ and the counter-e.m.f. in relation to the rate of rotation, FIG. 5 shows the variation of the collector-emitter voltage $U_{CE}$ of the transistor 9 in FIG. 1, FIG. 6 shows the variation of the voltage $U_P$ at the uninverted input of the operational amplifier 21 in FIG. 1, FIG. 7 shows the variation of the voltage $U_N$ at the inverted input of the operational amplifier 21, FIG. 8 shows the variation of the output voltage $U_A$ of the operational amplifier 21, FIG. 9 shows the variation of the output voltage U of the timing circuit of FIG. 1, FIG. 10 shows the variation of the triggering voltage $U_G$ of the thyristor of FIG. 1.

DESCRIPTION OF THE PREFERRED EMBODIMENT

Firstly the general means of operation will be briefly explained.

On starting of the motor its current consumption is considerably higher than in normal operation and this leads in most cases to heavy loading of the voltage source which can be undesirable, as, for example, in the case of simultaneous starting of several motors. In order to prevent this high current consumption a starter current limit circuit is provided which limits or shuts off the current supply to the windings when a given current value is exceeded.

Futhermore it is usual for the commutation circuit of commutatorless direct current motors to be controlled by digitally switched Hall-IC's although it is within the scope of the invention to use other types of switching element.

In the case of stalling of the motor by some means, in order to prevent destruction of the motor due to too great a heating of the windings or the electronic components as a result of the increasing motor current, known motors are subjected to an automatic cut-out. After automatic cut-out the motor can be taken back into service following removal of the blockage and temporary cut-off of the supply voltage.

In the following the invention is described in more detail.

Normal Operation

A two-pulse, two-pole commutatorless direct current motor is first described herein. Two-pulse means, in this context, that the windings 1, 2 (FIG. 1) of the motor receive two pulses per turn of the rotor.

The invention is however in no way restricted to motors of this type of construction, but, as will be shown later, can also be used without restriction with motors of a higher pulse and higher pole type of construction.

During operation of the motor, rotor position signals are produced by co-operation of the rotor and a rotor position sensor, by means of which signals the stator windings 1, 2 are controlled. To this end the rotor position sensor is formed as a digitally switched Hall-IC 3, the output 3a of which can take on the logical value "L" or "H" according to the rotor position. The value "L" means that there is zero potential at the output 3a, whereas with value "H" almost the whole operational voltage is present at the output 3a.

Figure 1:
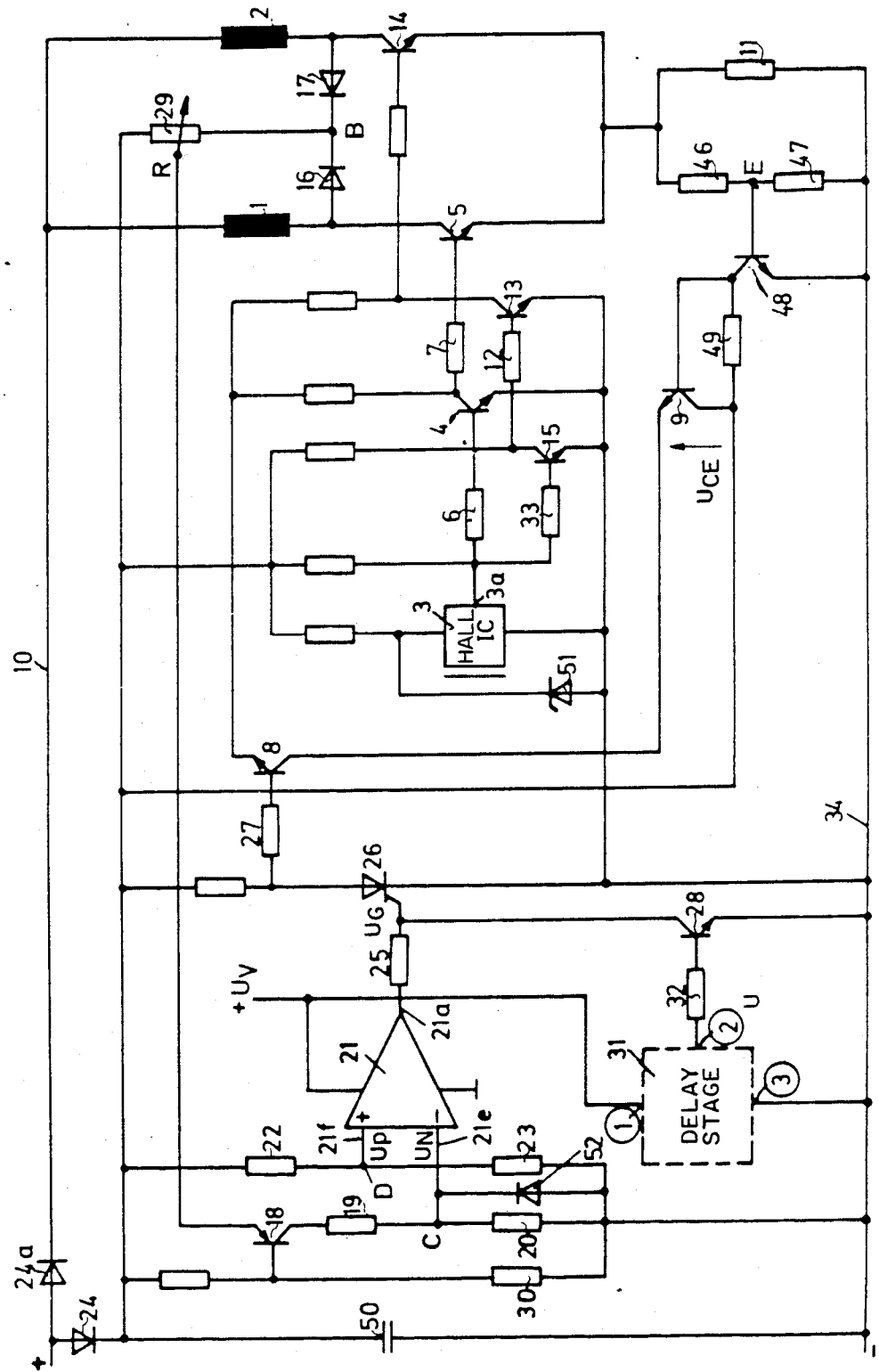
FIG. 1 shows a commutation circuit of a two-winding, two-pulse commutatorless direct current motor having a protection circuit constructed in accordance with the invention.

In the following the commutator apparatus shown in FIG. 1 will be described. If the output 3a of the Hall-IC 3 is at zero potential, that is at value "L", then this has the result that this potential is applied to the base terminals of transistors 4 and 15 via their series resistors 6 and 33. Thereby the transistors 4 and 15 are turned off. Due to the turning off of the collector-emitter paths of the transistors 4 and 15 the "H" level is then applied to the collectors of these transistors. In this respect it is assumed that, in the normal operation, transistors 8 and 9 are rendered conductive by the circuit according to the invention, or by a starting current limitation stage, which will be described later.

The high collector potential of transistor 4 results in turning on of the transistor 5 via the resistor 7 thereby enabling winding current to flow through the winding 1. The current flows from the positive line 10 through the transistor 5 and, if necessary, through a very low value resistor 11 to the negative line 34.

Also a transistor 13 is turned on via a resistor 12, and this has the result that the base of transistor 14 is placed at zero potential. This prevents turning on of the transistor 14 so that no current flows through the winding 2.

If the rotor of the motor then turns a further half turn, the magnetic field of the rotor magnets alters so as to oppose the Hall-IC 3. This causes the output potential at the output 3a to change from "L" to "H", i.e. almost the whole operating voltage is applied to the output 3a. Turn on of the transistors 4 and 15 results, and the transistor 5 is turned off by the negative potential applied to its base. The current through the winding 1 is thereby interrupted. Similarly zero potential is applied to the base of the transistor 13, which leads to it turning off. This causes its collector potential to rise and the transistor 14 is turned on. Current then flows through the winding 2 with the current taking a path from the positive line 10 through the winding 2, the collector-emitter path of the transistor 14 and, if necessary, through the very low value resistor 11 to the negative line 34.

Thus switching from one winding to another takes place after each half turn of the rotor.

During running of the motor a counter-e.m.f. exists in the windings 1, 2 which counteracts the operating voltage. This induction voltage $U_i$ is outputted through diodes 16 or 17 when the associated stator winding is not energised. If, for example, the transistor 5 is already turned off, a voltage $U_B$ exists at point B, which consists of the sum of the operating voltage $U_v$ and the voltage $U_i$ induced in the winding. The same applies with the winding 2, when the transistor 14 is turned off and the winding 1 is energised due to the transistor 5 being turned on.

This summed voltage is higher than the operating voltage and is applied to the emitter of a transistor 18. The operating voltage $U_v$ is applied to the base of the transistor 18, so that the transistor 18 is turned on due to the negative base-emitter voltage $U_{BE}$. This has the result that the voltage made up of the sum of the operating voltage and the counter-e.m.f. is applied to a voltage divider constituted by resistors 19, 20 connected in series. A voltage suitably set by the divider relationship is taken off from the connection point C between the resistors 19 and 20 and applied to the inverted input 21e of an operational amplifier 21.

There is applied to the uninverted input 21f of the operational amplifier 21 a fixed reference voltage which is taken from the common connection point D of a voltage divider comprising resistors 22, 23. The resistor 22 is connected via a polar protection diode 24 to the positive line 10, whilst the resistor 23 is connected to the negative line 34.

The voltage dividers 19, 20 and 22, 23 have a resistance ratio such that, in normal operation, i.e. during interruption-free running of the motor, there is a higher voltage at the inverted input 21e than at the uninverted input 21f (see FIGS. 6 and 7).

This has the result that the output 21a of the operational amplifier 21 (FIG. 8) is at zero potential ("L" level). This potential is applied through a resistor 25 to the gate terminal of a thyristor 26 and simultaneously also to the collector terminal of a transistor 28. This "L"

level prevents the thyristor from triggering. Since the anodecathode path of the thyristor 26 is turned off the "H" level is applied to the base of the transistor 8. This has the result, as already mentioned above, that the transistor 8 is rendered conductive during interruption-free running so that, via the transistor 9 which is also rendered conductive, the operating voltage is applied to the collectors of the transistors 4 and 13.

Switching Off

If the motor is stalled by any means or falls below a predetermined rate of rotation then automatic cut-out takes place. This is necessary because, when the motor is stopped for example, the increasing motor current can result in thermal destruction of the windings 1, 2 or of the power transistors 5 and 14. This is due to the fact that, on decreasing of the rate of rotation or stopping off the motor, the counter-e.m.f. decreases or falls to zeo. The resulting increase in the motor current and the associated development of heat can lead to destruction of the components.

The protection circuit according to the invention operates in response to the counter-e.m.f. of the windings 1, 2 in normal operation. If this is present, the protection circuit does not operate. If the counter-e.m.f. ceases or falls below a given value, the protection circuit operates.

If the motor is stopped, the counter-e.m.f. in the windings 1, 2 ceases. Thus the operating voltage $U_v$ is applied through conducting transistor 5 and connected coil 1 to point B between the two windings via the winding 2. Virtually the same potential is applied to the emitter as to the base of the transistor 18, with the result that its collector-emitter path is turned off, as soon as its base-emitter voltage falls below the necessary value. This happens at time t 1 as shown in FIGS. 5 to 10.

Turning off of the transistor 18 results in lowering of the potential at point C of the voltage divider 19, 20 to zero. This zero potential is supplied to the inverted input 21e of the operational amplifier 21 (FIG. 7). As a positive voltage is applied by the voltage divider 22, 23 to the uninverted input 21f (FIG. 6), there then appears at the output 21a the logical signal "H" (FIG. 8, time t 1). This signal is supplied via the resistor 25 to the gate terminal of the thyristor 26 and thereby initiates triggering of this thyristor 26 (FIG. 10, time t 1). Turning on of the thyristor 26 connects the base of the transistor 8 to the negative line 34 via a resistor 27. This leads to turning off of the transistor 8, as soon as the base-emitter voltage falls below a required value. The supply voltage for the bases of the transistors 5 and 14 is thereby interrupted so that these transistors 5 and 14 turn off and interrupt the current flow through both of the windings 1, 2. Under these conditions the transistor 28 is also turned off.

The above described conditions are maintained until a cut-off of the operating voltage is effected (FIG. 4, time t 2).

In order to be able to influence the cut-out rate of rotation, resistors 29 and 30 are provided. The variable resistor 29 is positioned between point B and the positive supply voltage line through the diode 24. The variable centre contact is connected to the emitter of the transistor 18.

Figure 11:
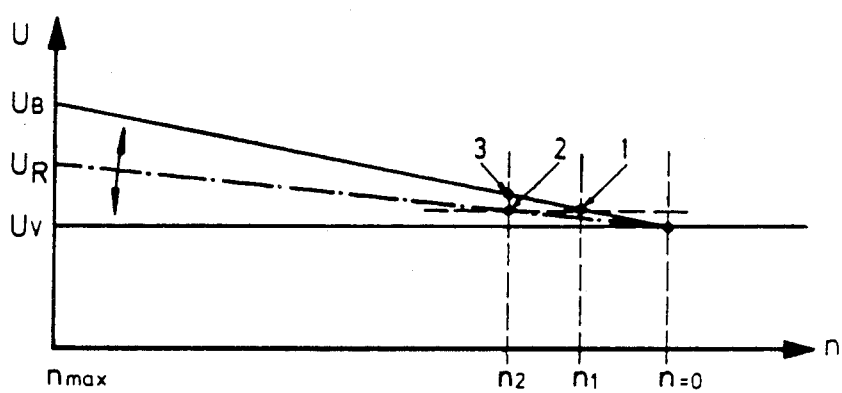
FIG. 11 shows the influence on the cut-out rate of rotation of the resistor 29 according to FIG. 1.

With the aid of the resistor 29, the voltage $U_R$ at point R of the circuit can be varied. If, for example, the center contact of resistor 29 is in its low position, then the voltage $U_B$ of point B is applied to the emitter of the transistor 18. If the center contact of the resistor 29 is moved upwards, then the voltage $U_R$ decreases. As a certain difference must be provided between the operating voltage and the counter-e.m.f. for turning on of the transistor 18, this means that the voltage $U_B$ must be higher than before. This is shown in FIG. 11. Without resistor 29 or with the resistor 29 having its center contact in its lowermost position, the base-emitter voltage of the transistor 18 falls below the necessary value at the point 1. This results in cut-out of the motor at a rate of rotation n 1.

If the center contact of the resistor 29 is moved upwards, the voltage $U_R$ decreases. As the transistor 18 always turns on or off at the same cut-off threshold, the outputted counter-e.m.f. must be higher than before. Point 2 shows the voltage necessary for the turning on of the transistor 18, for which, however, a counter-e.m.f. corresponding to point 3 is necessary. This counter-e.m.f. can however be achieved by a rate of rotation n 2 which is greater than n 1. The cut-out of the motor can therefore be changed to a higher rate of rotation.

If, on the other hand, a resistor 30 is introduced between the base of the transistor 18 and the negative line 34, then the cut-out rate of rotation can be changed to a smaller rate of rotation.

Starting of the Motor

In the above description the starting current limitation which is also provided according to the invention is not taken into consideration, as it is described separately. It is simply pointed out that the transistor 9 is to be regarded as a through-connected component.

When the operating voltage is switched on, the first thing to come from this is that the counter-e.m.f. $U_i$ in the motor windings 1, 2 increases with the increasing rate of rotation of the motor from zero to its maximum value.

At first the counter-e.m.f. due to rotation through the diodes 16, 17 is nearly zero (FIG. 4, time t 3).

This has the result that the transistor 18 is not turned on so that, as already described, the point C of the voltage divider 19, lies at zero potential. The inverted input 21e of the operational amplifier 21 is therefore more negative than the uninverted input 21f (FIGS. 6 and 7, time t 3). As a result of this the logical value "H" appears at the output of the operational amplifier 21 (FIG. 8, time t 3) which would lead to triggering of the thryistor 26 and also to turning off of the transistor 8. This would have the result of turning off the transistors 5 and 14 so that the starting process would immediately be interrupted. In order to prevent this from occurring a so-called start-up bridging circuit is provided according to the invention, by means of which the critical starting moment, at which the counter-e.m.f. in the windings 1, 2 is too small to automatically switch the output of the operational amplifier 21 from the logical value "H" to "L", can be bridged. This start-up bridging circuit consists of a delay stage 31 which emits a positive output voltage when the operating voltage is applied to it over a certain period of time.

The positive output voltage from the delay stage 31 is applied via a resistor 32 to the base of the transistor 28 which is turned on as a result of the positive base-emitter voltage and thereby an "L" potential is applied to the gate terminal of the thyristor 26. This has the result that the "H"-signal from the output of the operational amplifier acting on the gate terminal is suppressed so that triggering of the thyristor 26 cannot ensue. Due to the turning off of the thyristor 26, the transistor 8 is rendered conductive so that the circuit operates according to the commutation process described initially.

With increasing rotation of the rotor the counter-e.m.f in the motor windings 1, 2 also increases. When the base-emitter voltage required for transistor 18 is exceeded, the transistor 18 turns on. In this way the potential increases at point C of the voltage divider 19, 20. This occurs in accordance with FIGS. 5 to 10 at time t 4.

If this voltage acting on the inverted input 21e exceeds the voltage acting on the uninverted input 21f, then the output voltage of the operational amplifer 21 changes from the value "H" to "L" (FIGS. 6, 7, 8). This means that the thyristor 16 can no longer be triggered by the operational amplifier 21 and therefore the start-up bridging realised by the delay stage 31 is no longer necessary. The start-up bridging through the delay stage 31 must therefore be operative until the counter-e.m.f. induced in the windings 1, 2 suffices to switch the operational amplifier 21 from function "H" to "L". After the delay stage 31 has finished functioning its output lies at "L" and the turning off of the transistor 28 ensues and also the automatic cut-out is again operational for stalling protection. This is the case at time t5 in FIG. 9.

Figure 2:
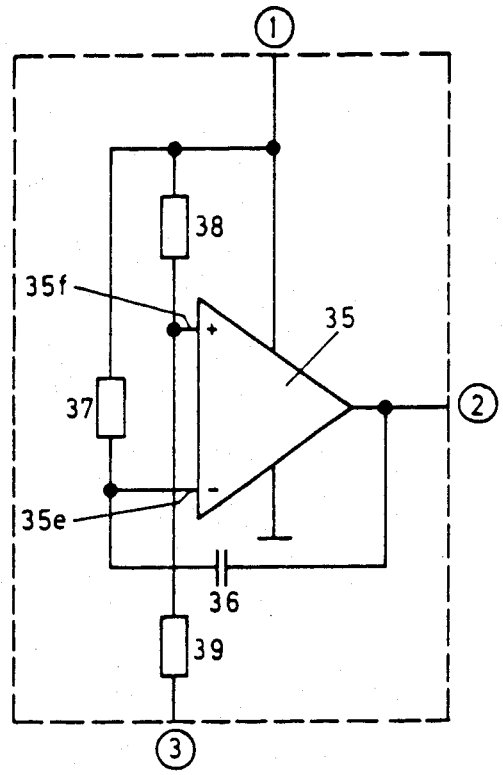
FIG. 2 shows a delay circuit used in the invention which is shown as an integrating circuit.
Figure 3:
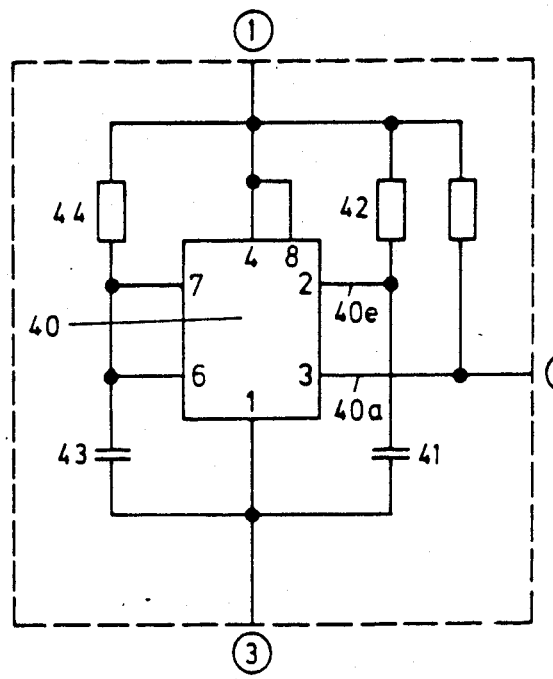
FIG. 3 shows an alternative delay circuit used in the invention consisting of a timing circuit.

The delay stage 31 of the start-up bridging circuit can either be in the form of an integrating circuit (FIG. 2) or a monostable sweep stage (FIG. 3).

If the start-up bridging circuit is in the form of an integrator circuit (FIG. 2), it may be constituted by a wired up operational amplifier 35. In this case the output of the operational amplifier is fed back through a capacitor 36 to the inverted input 35e which is connected via a resistor 37 to a stabilised power source. The uninverted input 35f is connected on the one hand via a resistor 38 to the stabilised power source and on the other hand via a resistor 39 to the negative line 34.

When the operating voltage is applied, the integrator is switched on. The output voltage of the integrator, as shown in FIG. 9, curve a, falls linearly from a maximum value to zero and thereby after a certain time turns off the transistor 28.

If the start-up bridging circuit is in the form of a monostable sweep stage, this can be constituted, for example, according to FIG. 3 by a timer (Type SE 555) 40. This is connected at its input 40e through a capacitor 41 to zero potential and through a resistor 42 to a positive potential. When the operating voltage is applied, the capacitor 41 charges and a square-wave voltage (FIG. 9, curve b) appears at the output 40a of the timer. The duration of this voltage depends upon the timing constant of the timing circuit comprising a capacitor 43 and a resistor 44. This voltage is applied to the transistor 28 until the expiry of the timing.

As already mentioned, the circuit is furnished with starting current limitation, which allows it to limit the high starting current during the starting phase. For this reason the emitters of transistors 5 and 14 are connected together and through a circuit comprising, in parallel, the resistor 11 and the series-connected resistors 46, 47 to the negative line 34. The values of the resistors in this parallel circuit are such that the winding currents flow essentially through the resistor 11.

At connection point E between the resistors 46 and 47, the base of a transistor 48 is connected, its emitter being connected to the negative line 34 and its collector being connected both to a resistor 49 and to the base of the transistor 9. The other end of the resistor 49 is connected to the collector of the transistor 9 and inter alia through the diode 24 to the positive line 10.

If there now flows, as necessary during starting, a high current through the motor windings 1, 2, then the greater part of the current flows through the low value resistor 11 and a negligible smaller part flows through the series-connected resistors 46, 47. The value of the resistor 47 is such that, with a coil current of about 4A for example, the potential drop across the resistor 47 becomes so great that the transistor 48 is turned on and thereby pulls the base of the transistor 9 in the direction of zero potential. The transistor 9 is thereby turned off and interrupts with its collector-emitter path the base currents of the transistors 5 and 14, which are thereby turned off. This has the result that the winding currents are interrupted so that no potential drop then occurs across the resistor combination 11, 46, 47. Accordingly the transistor 48 is again turned off so that, due to its rising collector potential, the transistor 9 is turned on again and again supplies the base currents for the transistors 5 and 14. This process then repeats itself until an appropriate rate of rotation of the motor is arrived at. Then, as a result of the counter-e.m.f. which has meanwhile increased in the windings 1, 2, a sufficiently reduced motor current flows that the potential drop across the resistor 47 no longer suffices to turn on the transistor 48.

By a suitable choice of resistors 11, 46, 47, it is possible to alter the level of the starting current, whereby, in particular through the use of an adjustable resistor 47, the starting current can be varied continuously.

As already mentioned, acording to the invention the automatic cut-out including the starting current limitation is not only suitable for two-pulse, two-pole motors, but is also suitable for higher pulse and higher pole motors. It is necessary merely to output the e.m.f. of each winding and to make it available at point B corresponding to the circuit already described. Furthermore the emitter of the transistor 8 is to be connected to the equivalent points of the power transistors of the commutation circuit associated with the windings such that driving of the base currents of the power transistors can ensue.

In the same way a simple integration of the starting current limitation is possible. Here the winding currents are simply to be supplied to the resistors 11, 46. 47 connected to the above circuit so that the motor works in the already described manner.

The following provides further explanation in relation to the invention.

Diodes 24 and 24a are polar protection diodes which protect the motor controls against inadvertent wrong connection of the operating voltage. A capacitor 50 connected between the positive and negative line serves for smoothing of the direct voltage as well as for partial screening. A breakdown diode 51 connected in parallel with the Hall-IC 3 serves to stabilise the voltage of the Hall-IC.

The breakdown diode 52, which can be connected in parallel with the resistors 20, serves so that the voltage on the inverted input 21e of the operational amplifier can be limited. Thereby it is possible to use the circuit with suitable resistor combinations of 19, 20 for a substantially higher operational voltage range.

The circuit according to the invention can be constructed at least partly as a integrated circuit or hyrid circuit whereby a substantial space-saving is enabled and increased operational safety results.

We claim:

1. A protection circuit which protects against stalling in a commutatorless direct current motor having a plurality of stator windings receiving an operating voltage and being selectively energized, comprising:
respective semiconductor circuit elements disposed in series with each stator winding and operative to be turned on or off in response to a control voltage induced in said stator windings, said control voltage being the sum of the operating voltage in the unenergized stator windings and the counter-e.m.f. induced in said unenergized windings;
means responsive to said control voltage to turn on the respective semiconductor circuit element connected to the energized stator winding if said control voltage is greater than said operating voltage, and to turn off said respective semiconductor circuit element if said counter-e.m.f. falls below a predetermined cutoff value; and
a start-up bridging circuit operative in response to initial application of the operating voltage to the motor to override said means and maintain said respective semiconductor circuit elements turned on for a time interval sufficient for the counter-e.m.f. to build up to said predetermined cutoff value,
whereby the protective circuit does not prevent normal start-up of the motor.

2. A protection circuit according to claim 1, further comprising a starting current limitation circuit operative, up to a predetermined level of the starting current flowing through the motor windings, to repetitively turn the semiconductor circuit elements on and off until the counter-e.m.f. produced in the motor windings has reached such a level that only a limited motor current greater than zero can flow through the windings.

3. A protection circuit according to 1, wherein between the motor windings and the semiconductor circuit elements, which are in the form of power transistors having their collector-emitter paths connected in series with the windings, the total voltage is picked up and conducted to the emitter of a control transistor, the collector of which is connected to the inverted input of an operational amplifier and the base of which is substantially at the potential of the operating voltage, and the output of the operational amplifier is connected to an inversion circuit which so controls the bases of the power transistors that, with an "L" level at the output of the operational amplifier, an "H" level is applied to the bases of the power transistors to turn the transistors on, and that, with an "H" level at the output of the operational amplifier, an "L" level is applied to the bases of the power transistors to turn the transistors off.

4. A protection circuit according to claim 3, wherein the output of the operational amplifier is connected to the gate terminal of a thyristor which comprises said inversion circuit, such that the thyristor is turned off by an "L" level at the output of the operational amplifier and turned on by an "H" level at the output of the operational amplifier, and the thyristor is connected between positive and negative lines and is connected by its anode to the base of a first transistor, the emitter of which controls the base of each power transistor, whereby, on turning off the thyristor, the first transistor is turned on, thus turning on the power transistor and, on turning on of the thyristor, the first transistor is turned off, thus turning off the power transistors.

5. A protection circuit according to claim 4, wherein said start-up bridging circuit comprises a delay stage which emits a positive output voltage when the operating voltage is applied to it over a certain period of time, which output voltage is applied to the base of a second transistor, the collector-emitter path of which lies between the gate terminal of the thyristor and the negative line such that, on turning on of the second transistor, an "H" level at the output of the operational amplifier is pushed down and an "L" level is applied to the gate terminal of the thyristor so that the thyristor is turned off.

6. A protection circuit according to claim 5, wherein the delay stage is selected from the group consisting of an integrator and a monostable sweep stage.

7. A protection circuit according to claim 2, wherein the starting current limitation circuit comprises in parallel, a relatively low value resistor and two relatively high value series-connected resistors, the circuit being connected between the emitters of the power transistor and the negative line of the operating voltage, a third transistor having its base connected to a point between the series-connected resistors and its collector-emitter path disposed between the positive and negative lines and furthermore having its collector connected to the base of a fourth transistor, the emitter of which is connected to the collector of the first transistor and the collector of which is connected to the positive line of the operating voltage such that, on turning on the third transistor, the fourth transistor is turned off and thereby the base current of the power transistors is interrupted via the first transistor and the power transistors are turned off.

8. A protection circuit according to claim 1, wherein the pick-up of the control voltage occurs through a diode and an adjustable resistor.

9. A protection circuit according to claim 3, wherein the collector of the control transistor is connected through a voltage divider comprising two resistors to the negative line of the operating voltage, and the inverted input of the operational amplifier is connected to a point between the two resistors constituting the voltage divider.

10. A protection circuit according to claim 3, wherein a fixed voltage level is applied to the uninverted input of the operational amplifier through a voltage divider comprising resistors.

11. A protection circuit which protects against stalling in a commutatorless direct current motor having a plurality of stator windings receiving an operating voltage and being selectively energized, comprising:
respective semiconductor circuit elements disposed in series with each stator winding and operative to be turned on or off in response to a control voltage induced in said stator windings, said control voltage being the sum of the operating voltage in the unenergized stator windings and the counter-e.m.f. induced in said unenergized windings; and
means responsive to said control voltage to turn on the respective semiconductor circuit element connected to the energized stator winding if said control voltage is greater than said operating voltage, and to turn off said respective semiconductor circuit element if said counter-e.m.f. falls below a predetermined cutoff value.

* * * * *